US011849095B2

(12) United States Patent
Shimomukai et al.

(10) Patent No.: US 11,849,095 B2
(45) Date of Patent: Dec. 19, 2023

(54) PROFILE CREATION DEVICE AND METHOD GENERATING AND DISPLAYING INPUT AND OUTPUT DEVICE COLOR GAMUTS AS 3D IMAGES

(71) Applicant: SEIKO EPSON CORPORATION, Tokyo (JP)

(72) Inventors: Takumi Shimomukai, Matsumoto (JP); Katsuyuki Tanaka, Matsumoto (JP); Takahiro Kamada, Matsumoto (JP); Masayuki Seko, Matsumoto (JP); Naoki Hagihara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/161,631

(22) Filed: Jan. 30, 2023

(65) Prior Publication Data

US 2023/0247167 A1 Aug. 3, 2023

(30) Foreign Application Priority Data

Jan. 31, 2022 (JP) ................................. 2022-012887

(51) Int. Cl.
*H04N 1/60* (2006.01)
*H04N 1/00* (2006.01)
*H04N 1/04* (2006.01)

(52) U.S. Cl.
CPC ....... *H04N 1/6061* (2013.01); *H04N 1/00411* (2013.01); *H04N 1/0411* (2013.01); *H04N 1/603* (2013.01); *H04N 1/6008* (2013.01)

(58) Field of Classification Search
CPC ........... H04N 1/00408; H04N 1/00411; H04N 1/0044; H04N 1/00442; H04N 1/00445;
(Continued)

(56) References Cited

U.S. PATENT DOCUMENTS

| 7,145,574 B2* | 12/2006 | Kondo | H04N 1/603 |
| | | | 345/589 |
| 7,755,817 B2* | 7/2010 | Ho | H04N 1/6058 |
| | | | 358/1.9 |
| 2015/0207958 A1* | 7/2015 | Tasaki | H04N 1/603 |
| | | | 358/1.9 |

FOREIGN PATENT DOCUMENTS

| JP | 2006-30409 A | * | 2/2006 |
| JP | 2014-068181 A | | 4/2014 |

(Continued)

*Primary Examiner* — Scott A Rogers
(74) *Attorney, Agent, or Firm* — WORKMAN NYDEGGER

(57) ABSTRACT

A profile creation device that causes a display section to display a display screen displaying an input color space image and an output color space image, the profile creation device includes an acquisition section that acquires first color gamut data indicating a color space related to the input device and second color gamut data indicating a color space related to the output device, an image generating section configured to generate an input color space image of a three dimensional image based on the first color gamut data and an output color space image of a three dimensional image based on the second color gamut data, a display control section configured to generate screen data for displaying the display screen having an image display area for displaying the input color space image and the output color space image generated by the image generating section, and an input and output section for transmitting the screen data generated by the display control section to the display section.

10 Claims, 12 Drawing Sheets

(58) Field of Classification Search
CPC ............ H04N 1/00448; H04N 1/0045; H04N 1/00453; H04N 1/0049; H04N 1/6002; H04N 1/6005; H04N 1/6008; H04N 1/6016; H04N 1/6019; H04N 1/6022; H04N 1/6025; H04N 1/603; H04N 1/6058; H04N 1/6061; H04N 1/6063; H04N 1/6066; H04N 1/6069
See application file for complete search history.

(56) References Cited

FOREIGN PATENT DOCUMENTS

| | | | |
|---|---|---|---|
| JP | 2015-089056 A | | 5/2015 |
| JP | 2023-107342 A | * | 8/2023 |

* cited by examiner

| INPUT VALUE | DEVICE OUTPUT VALUE |
|---|---|
| (100,-1,9) | (0,0,30,0) |
| (100,-3,19) | (0,0,55,0) |
| (99,-5,31) | (0,0,80,0) |
| (99,-6,45) | (0,0,105,0) |
| (99,-8,60) | (0,0,135,0) |
| (98,-9,77) | (0,0,155,0) |
| (98,-10,92) | (0,0,180,0) |
| (97,-10,106) | (0,0,205,0) |
| (97,-10,117) | (0,0,230,0) |
| (96,-10,126) | (0,0,255,0) |

209,209e

| INPUT VALUE | DEVICE OUTPUT VALUE | CHANGE |
|---|---|---|
| Lab=(52,104,37) | CMYK=(0%,86%,38%,0%) | PERMIT |
| Lab=(30,-24,-82) | CMYK=(85%,75%,22%,30%) | DENY |
| | | |
| | | |
| | | |
| | | |
| | | |
| | | |

FIG. 14

PROFILE CREATION DEVICE AND METHOD GENERATING AND DISPLAYING INPUT AND OUTPUT DEVICE COLOR GAMUTS AS 3D IMAGES

The present application is based on, and claims priority from JP Application Serial Number 2022-012887, filed Jan. 31, 2022, the disclosure of which is hereby incorporated by reference herein in its entirety.

BACKGROUND

1. Technical Field

The present disclosure relates to a profile creation device and a profile creation method.

2. Related Art

A method is known of creating a color conversion table for color conversion from an input value to a device value of an output device. The color conversion table is included in the profile. JP-A-2014-68181 shows that a color conversion table generating apparatus sets a target color for a maximum chroma point in an input color gamut. The maximum chroma point is a color value at which saturation is highest for each hue. A color conversion table generating apparatus displays, on a display section, a target color specifying screen for designating a maximum chroma point and a target color. The target color specifying screen displays an input color space indicating the maximum chroma point in each hue and an output color space related to the target point. The image showing the maximum chroma point is a two dimensional image.

When the input color space and the output color space are displayed on the display section as a two dimensional image, it is difficult for the user to visually check a ridge line or the like of each color space and to grasp the relationship between the input color space and the output color space.

SUMMARY

A profile creation device that causes a display section to display a display screen displaying an input color space image related to an input device and an output color space image related to an output device, the profile creation device according to this disclosure includes an acquisition section that acquires first color gamut data indicating a color space related to the input device and second color gamut data indicating a color space related to the output device, an image generating section configured to generate an input color space image of a three dimensional image based on the first color gamut data and an output color space image of a three dimensional image based on the second color gamut data, a display control section configured to generate screen data for displaying the display screen having an image display area for displaying the input color space image and the output color space image generated by the image generating section, and an input and output section for transmitting the screen data generated by the display control section to the display section.

A profile creation method for displaying a display screen for displaying an input color space image related to an input device and an output color space image related to an output device on a display section, the profile creation method, according to this disclosure, includes acquiring a first color gamut data indicating a color space related to the input device and a second color gamut data indicating a color space related to the output device, generating an input color space image of the three dimensional image based on the first color gamut data and an output color space image of the three dimensional image based on the second color gamut data, generating screen data for displaying the display screen having an image display area for displaying the input color space image and the output color space image, and displaying the display screen on the display section after transmitting the screen data to the display section.

BRIEF DESCRIPTION OF THE DRAWINGS

FIG. 14 shows a fifth condition input image.

DESCRIPTION OF EMBODIMENTS

Figure 1:
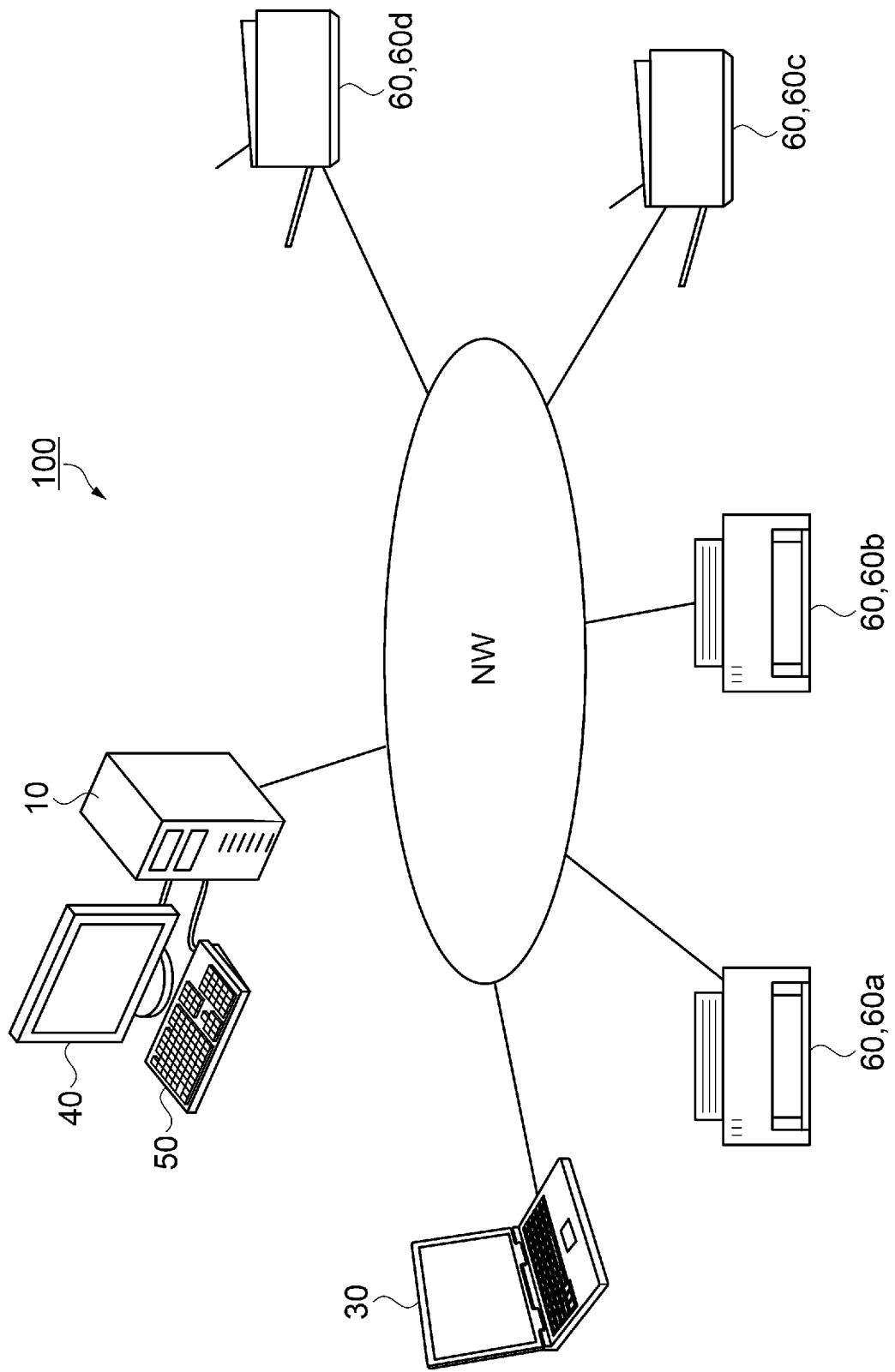
FIG. 1 shows schematic configuration of a printing system.

FIG. 1 shows schematic configuration of a printing system 100. The printing system 100 includes a print control device 10, a computer 30, and a plurality of printers 60. The print control device 10, the computer 30, and the plurality of printers 60 are connected to each other via a network NW. The print control device 10 is connected to a display unit 40 and an input unit 50. As shown in FIG. 1, the plurality of printers 60 are a first printer 60a, a second printer 60b, a third printer 60c, and a fourth printer 60d. The printing system 100 shown in FIG. 1 includes four printers 60, but is not limited thereto. The printing system 100 need include one or more printers 60 at least.

The print control device 10 generates various profiles. The profiles to be generated are an input profile, an output profile, or the like. The input profile performs color conversion between a device-dependent color space on an input device, such as an sRGB color space, and a device-independent color space. The output profile performs color conversion between a device-independent color space and an output device-dependent color space. The device-independent color space is a profile connection space managed in device independent colors, such as CIE L*a*b* and CIE XYZ, using an ICC profile. Hereinafter, L*a*b* will be referred to as Lab. The print control device 10 corresponds to an example of a profile creation device.

The print control device 10 performs color conversion using various profiles. For example, the print control device 10 receives image data expressed in an sRGB color space from the computer 30. The print control device 10 uses an input profile to convert image data represented in the sRGB color space into converted image data represented by color values in a profile connection space. The print control device 10 converts the converted image data into print data using the output profile related to the printer 60.

The print control device 10 may transmit the generated input profile or output profile to the computer 30 or the like. The computer 30 may generate print data by performing color conversion on the image data using the received output profile.

The computer 30 generates, edits, and processes image data. The image data handled by the computer 30 is expressed in an sRGB color space or the like. The computer 30 transmits image data to the print control device 10. The computer 30 may receive an output profile for a printer 60 from the print control device 10. The computer 30 may generate print data using an output profile for the printer 60. The computer 30 corresponds to an example of an input device.

The printers 60 print an image on various printing media M. The printers 60 print an image on a printing medium M using various printing methods. The printing system 100 includes a plurality of printers 60 of the first printer 60a, the second printer 60b, the third printer 60c, and the fourth printer 60d. The first printer 60a, the second printer 60b, the third printer 60c, and the fourth printer 60d have printing characteristics different from each other. The printing characteristics are the color gamut of the printer 60, the type of the printable printing medium M, the number of types of ink mounted, the printing method, and the like.

The printing system 100 may include a scanner, a digital camera, a colorimeter, and the like, (not shown.) A scanner or a digital camera corresponds to an example of an input device. The colorimeter may be used in creating the output profile.

The network NW is a communication network that couples the print control device 10, the computer 30, and the printer 60. The network NW communicably couples the print control device 10, the computer 30, and the printer 60 to each other in accordance with a predetermined communication standard. The network NW may be a local network constructed in a company or the like, or may be a global network. The network NW may be a communication network in which a local network and a global network are combined.

Figure 2:
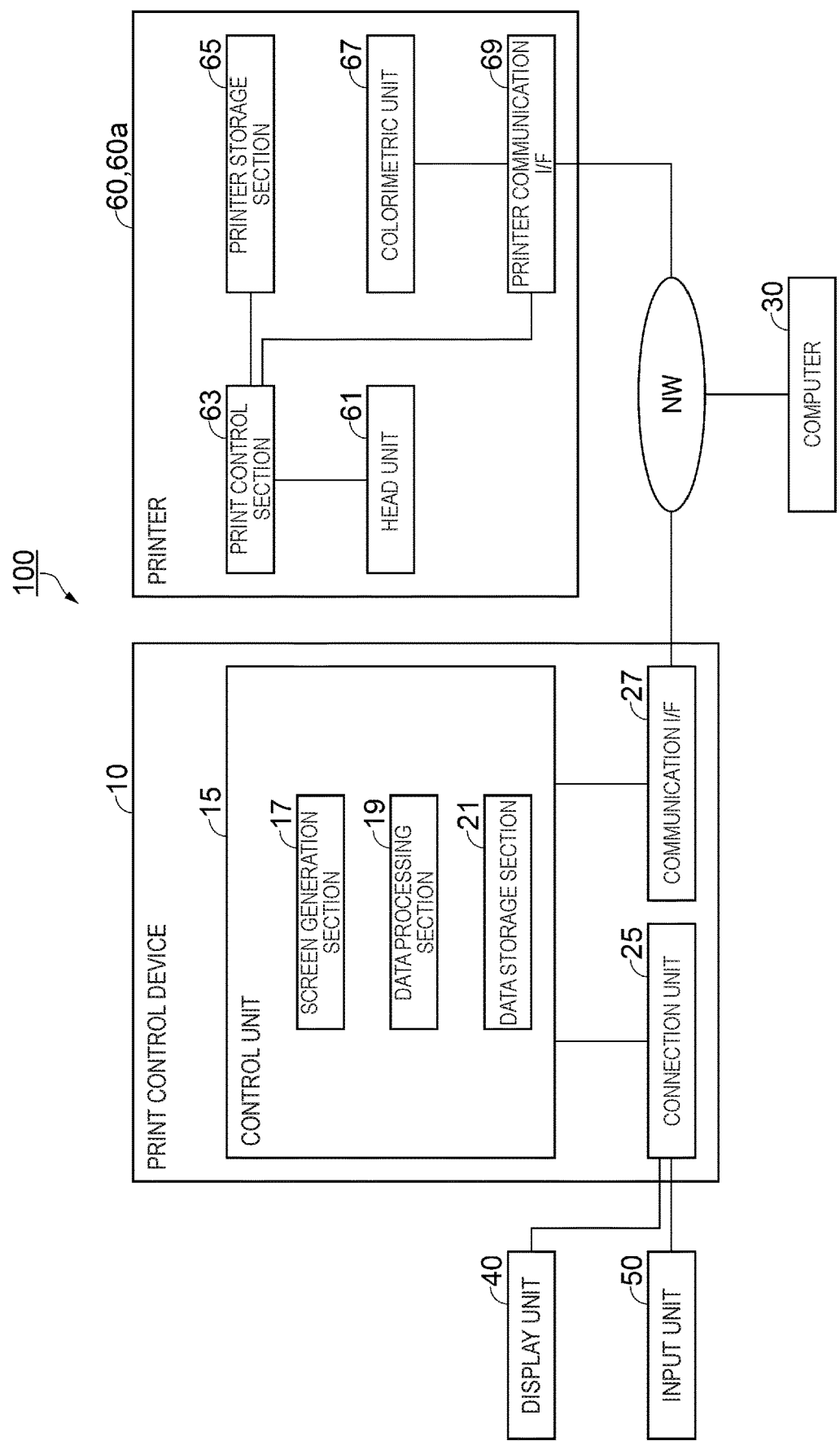
FIG. 2 shows a block diagram of a printing system.

FIG. 2 shows a block diagram of the printing system 100. In the printing system 100 illustrated in FIG. 2, the second printer 60b, the third printer 60c, and the fourth printer 60d are omitted. The block configurations of the second printer 60b, the third printer 60c, and the fourth printer 60d are similar to that of the first printer 60a shown in FIG. 2. In the printing system 100 of FIG. 2, the print control device 10, the computer 30, the display unit 40, the input unit 50, and the printer 60 are configured separately, but the configuration is not limited thereto. For example, the display unit 40 and the input unit 50 may be integrally configured.

The print control device 10 includes a control unit 15, a connection unit 25, and a communication interface 27. In FIG. 2, the interface is denoted as I/F. The print control device 10 operates as a functional unit by executing a program. The program executed by the print control device 10 is a profile generation application, a printer driver, or the like. The profile generation application generates various profiles. The printer driver generates print data for causing the printer 60 to execute printing.

The control unit 15 is a controller that executes a program. The control unit 15 operates as various functional units by executing programs. The control unit 15 may include a central processing unit (CPU), an application specific integrated circuit (ASIC), a digital signal processor (DSP), or the like. The control unit 15 may have a random access memory (RAM) or a read only memory (ROM) as a work area.

The control unit 15 functions as a screen generation section 17 and a data processing section 19. The screen generation section 17 and the data processing section 19 are functional units. The control unit 15 operates as the screen generation section 17 and the data processing section 19 by executing a profile generation program.

The screen generation section 17 generates display data for displaying various screens such as a setting screen 203 (to be described later), or the like. The display data is transmitted to the display unit 40 via the connection unit 25. The display data causes the display unit 40 to display a screen such as the setting screen 203. The setting screen 203 is a screen in which various settings for generating an output profile can be input by the user. The screen generation section 17 corresponds to an example of a display control section. The setting screen 203 corresponds to an example of a display screen.

The data processing section 19 generates various profiles such as an input profile and an output profile, or the like. The data processing section 19 acquires data stored in a data storage section 21, input data received by the connection unit 25, colorimetric data received by the communication interface 27, and the like. The data processing section 19 generates an output profile using the acquired data, input data, the colorimetric data, and the like. The data processing section 19 may generate print data to be transmitted to the printer 60.

The data processing section 19 generates various images included in the display data. The data processing section 19 generates an input profile image 220 indicating the color space of the input device based on input profile data. The input profile data corresponds to an example of first color gamut data indicating a color space related to the input device. The input profile image 220 will be described later. The data processing section 19 generates a printer gamut 230 indicating a color space of the printer 60 based on the colorimetric data. The printer gamut 230 will be described later. The data processing section 19 corresponds to an example of an image generating section. The data processing section 19 acquires the input profile data and the colorimetric data, and temporarily stores them in the work area of the control unit 15. The work area corresponds to an example of an acquisition section.

The data storage section 21 stores various programs to be executed by the control unit 15 and various data. The data storage section 21 stores the profile generation program and the printer driver. The various data includes a plurality of input profile data sets and a plurality of output profile data sets. The data storage section 21 stores information such as the colorimetric data (to be described later) and image data generated based on the colorimetric data. The data storage section 21 is configured by RAM, ROM, and the like. The data storage section 21 may include a magnetic storage device such as an hard disk drive (HDD), a semiconductor memory, or the like. The data storage section 21 may temporarily store various kinds of acquired data. The data storage section 21 corresponds to an example of an acquisition section.

The data storage section 21 stores a plurality of input profile data in a readable manner. The data storage section 21 may acquire and store the input profile data generated by the data processing section 19. The data storage section 21 may acquire and store input profile data transmitted from the computer 30 or the like. The data storage section 21 temporarily or in a non-volatile manner stores input profile data transmitted from the computer 30 or the like.

The connection unit 25 is connected to various units such as the display unit 40 and the input unit 50 to transmit and receive various data. The connection unit 25 is an input and output interface connected to various units. The connection unit 25 has a plurality of connection ports such as a communication port based on the universal serial bus (USB) standard, a display port, or the like. The connection unit 25 shown in FIG. 2 is connected to the display unit 40 and the input unit 50. The connection unit 25 transmits the display data generated by the screen generation section 17 to the display unit 40. The connection unit 25 receives input data input to the input unit 50. The connection unit 25 may transmit the received input data to the display unit 40. The connection unit 25 may transmit the display data generated by the screen generation section 17 based on the received input data to the display unit 40. The connection unit 25 corresponds to an example of an input and output section.

The communication interface 27 is communicably connected to the computer 30 and the printer 60. The communication interface 27 is connected to the computer 30 and the printer 60 in a wired or wireless manner according to a predetermined communication protocol. The communication interface 27 receives image data or the like from the computer 30. The communication interface 27 may transmit an output profile or the like to the computer 30. The communication interface 27 receives the colorimetric data or the like from the printer 60. The communication interface 27 may transmit print data or the like to the printer 60. The communication interface 27 may be communicably connected to various devices such as a digital camera and a colorimeter (not shown). The communication interface 27 corresponds to an example of a connection section.

The display unit 40 displays various kinds of images. The display unit 40 displays an image such as the setting screen 203 (to be described later), or the like, based on display data transmitted from the connection unit 25 of the print control device 10. The display unit 40 may display an image based on input data transmitted from the connection unit 25. The display unit 40 is communicably connected to the connection unit 25 of the print control device 10. The display unit 40 is a display formed of a liquid crystal panel or an organic electro-luminescence (EL) panel. The display unit 40 may be integrated with the print control device 10. The display unit 40 corresponds to an example of a display section.

The input unit 50 receives an input operation of the user. The input unit 50 acquires input data based on an input operation of the user. The input unit 50 transmits the acquired input data to the connection unit 25 of the print control device 10. The input unit 50 includes a keyboard, a mouse, and the like. The input unit 50 may be configured integrally with the display unit 40. When the display unit 40 is a display having a touch input function, the touch sensor corresponds to the input unit 50. The input data input to the touch sensor may be displayed on the display unit 40. The input unit 50 may be formed integrally with the print control device 10.

The printer 60 includes a head unit 61, a print control section 63, a printer storage section 65, a colorimetric unit 67, and a printer communication interface 69. FIG. 2 shows a first printer 60a as the printer 60. The first printer 60a is, for example, an ink jet printer that prints an image by ejecting ink onto the printing medium M. The printer 60 corresponds to an example of an output device.

The head unit 61 prints an image on the printing medium M. The head unit 61 prints an image on the printing medium M based on the control of the print control section 63. The head unit 61 prints a test chart 110 whose color will be measured by the colorimetric unit 67. The test chart 110 will be described later using FIG. 3. The head unit 61 may perform printing on the printing medium M based on the print data transmitted from the print control device 10.

The print control section 63 is a processor that controls the head unit 61. The print control section 63 causes the head unit 61 to perform printing by controlling the head unit 61 based on the print data. The print control section 63 causes the head unit 61 to print the test chart 110 based on the test chart data for profile adjustment. The print control section 63 reads the test chart data for profile adjustment stored in the printer storage section 65. The print control section 63 causes the head unit 61 to print the test chart 110 based on the read test chart data for profile adjustment.

The printer storage section 65 stores programs executed by the print control section 63 and various types of data. The printer storage section 65 is configured by RAM, ROM, or the like. The printer storage section 65 stores a plurality of test chart data. The plurality of test chart data includes ink amount adjustment test chart data, profile adjustment test chart data, and the like. The test chart data for profile adjustment is used when the printer 60 prints the test chart 110 on the printing medium M.

The printer storage section 65 stores the type of the printing medium M on which printing is performed by the head unit 61. The printer storage section 65 stores the type of the printing medium M on which the test chart 110 is to be printed. The type of printing medium M is input to a control panel (not shown). The printer 60 may determine the type of the printing medium M using a sensor or the like (not shown). The printer storage section 65 stores printing conditions. The printer storage section 65 stores printing conditions under which the test chart 110 is printed. The printing conditions to be stored are printing modes such as a high-speed printing mode and a high-definition printing mode, and various setting conditions corresponding to the printing modes, or the like. The printer storage section 65 may store colorimetric conditions used in the colorimetric unit 67.

The colorimetric unit 67 performs colorimetry of the test chart 110 printed on the printing medium M. The colorimetric unit 67 includes an image sensor such as a contact image sensor (CIS) or a charge coupled device (CCD). The colorimetric unit 67 measures the spectral reflectance of an image printed on the printing medium M. The colorimetric unit 67 measures, for example, the reflectances of light in a wavelength range from 380 nm to 730 nm as the spectral reflectance. The colorimetric unit 67 acquires a spectral reflectance as a measured value. The measured value is not limited to spectral reflectance. The colorimetric unit 67 may obtain a Lab value or an XYZ value as a measured value. The colorimetric unit 67 generates a plurality of measured values included in the colorimetric data.

The printer communication interface 69 is communicably connected with the print control device 10. The printer communication interface 69 is communicably connected to the print control device 10 via the network NW. The printer communication interface 69 connects to the network NW in a wired or wireless manner. The printer communication interface 69 transmits the colorimetric data measured by the colorimetric unit 67, the colorimetric conditions, the type of the printing medium M, and the printing conditions of the test chart 110 to the print control device 10. The printer communication interface 69 receives various data such as print data transmitted from the print control device 10, or the like.

Figures 3, 4:
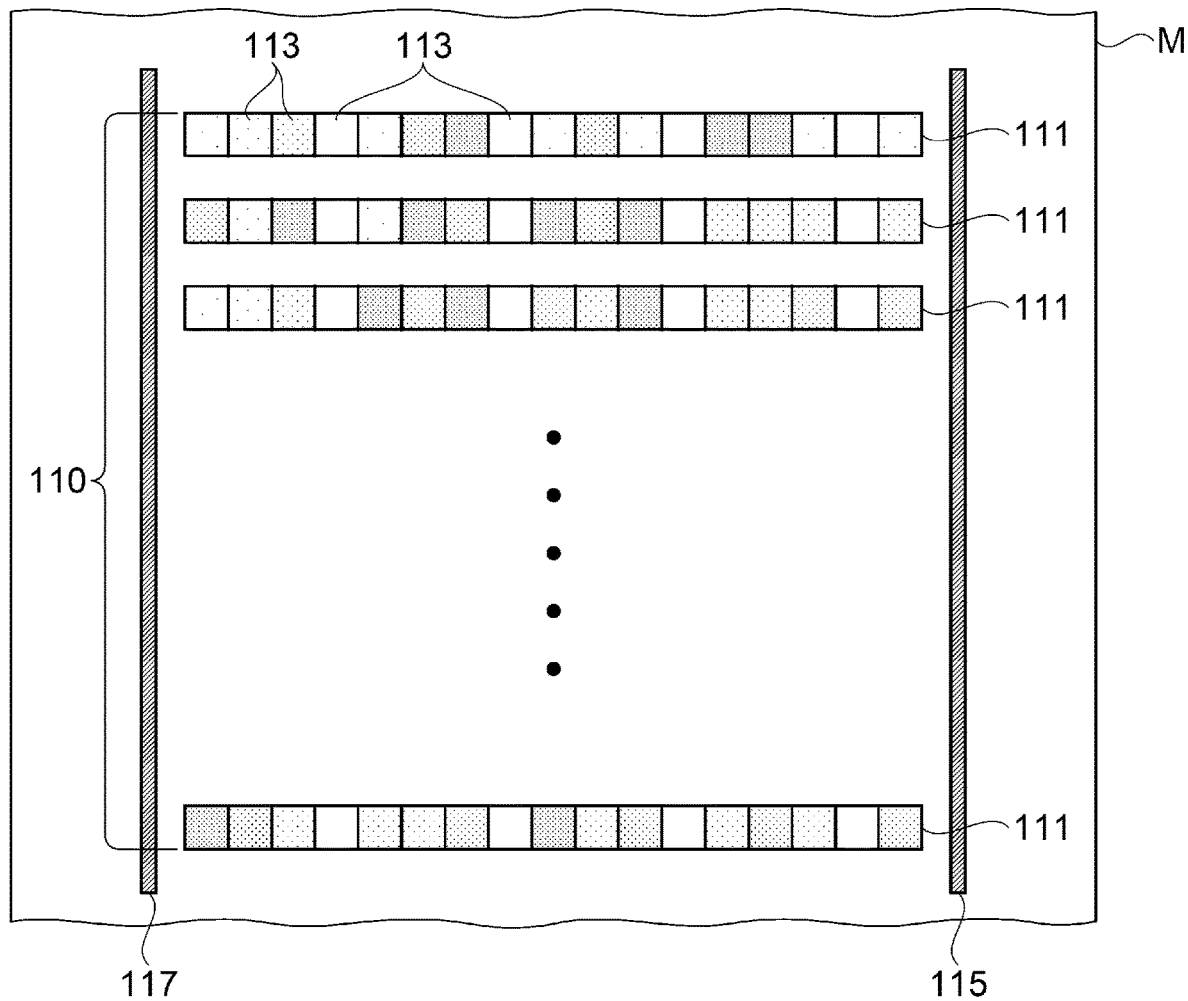
FIG. 3 is a schematic diagram of a test chart.
FIG. 4 is a table showing an outline of colorimetric data.

FIG. 3 shows the outline of the test chart 110. The test chart 110 is printed on the printing medium M. The test chart 110 is created by being printed on the printing medium M by the printer 60. The test chart 110 includes a plurality of patch image groups 111, a first position detection image 115, and a second position detection image 117. The test chart 110 corresponds to an example of a color chart.

The patch image groups 111 includes a plurality of patch images 113. The patch images 113 are printed corresponding to the gradation of the amount of ink printed by the printer 60. The number of patch image groups 111 and the number of patch images 113 are set as appropriate. The arrangement of the patch images 113 can be set as appropriate. The arrangement of the patch images 113 is not limited to the configuration of FIG. 3. The plurality of patch images 113 may not constitute the patch image groups 111.

The first position detection image 115 and the second position detection image 117 are printed on predetermined positions of the printing medium M. The colorimetric unit 67 determines the printing position of the patch image groups 111 or the patch images 113 by performing colorimetry on the first position detection image 115 and the second position detection image 117. The first position detection image 115 and the second position detection image 117 shown in FIG. 3 are in the shape of a straight bar, but are not limited thereto. The shapes and positions of the first position detection image 115 and the second position detection image 117 can be set appropriately.

FIG. 4 shows an outline of the colorimetric data. The printer 60 generates the colorimetric data by performing colorimetry on the test chart 110 shown in FIG. 3 using the colorimetric unit 67. The colorimetric data includes a plurality of print setting values and a plurality of spectral reflectances. The colorimetric data associates the spectral reflectances for each print setting value. The colorimetric data corresponds to an example of second color gamut data indicating a color space related to an output device.

The print setting value indicates the ink amount of each ink. (100, 100, 100, 100) in the last row indicates the ink amount of cyan ink, the ink amount of magenta ink, the ink amount of yellow ink, and the ink amount of black ink, respectively. The ink amount of the cyan ink is hereinafter referred to as a cyan ink amount. The ink amount of the magenta ink is hereinafter referred to as the magenta ink amount. The ink amount of the yellow ink is hereinafter referred to as the yellow ink amount. The ink amount of the black ink is hereinafter referred to as a black ink amount. The ink amount of each ink is indicated by a value from 0 to 100. Each ink amount is indicated by a gradation value with the maximum value of the ink ejection amount being 100%. The ink amount 100% indicates an ink amount when a predetermined number of ink dots are discharged to a region where a predetermined number of ink dots having a predetermined size can be discharged. (100, 100, 100, 100) indicates a cyan ink amount of 100%, a magenta ink amount of 100%, a yellow ink amount of 100%, and a black ink amount of 100%. The print setting value corresponds to an example of the generated gradation value.

The spectral reflectance is a measured value measured by the colorimetric unit 67. The values of (0.2, 0.05, * * *, 0.3) in the first row indicate the reflectances of light of the respective wavelengths. The value 0.2 indicates the reflectance of light of 380 nm. The value 0.05 indicates the reflectance of light of 390 nm. Value between 0.05 and 0.3 are omitted in the table, but represent the light reflectivity for each 10 nm. The spectral reflectance includes reflectance of light for each 10 nm from 380 nm to 730 nm. The spectral reflectance of the first row is a measured value, when the print setting value is (0, 0, 0, 0). The value 0 indicates that the amount of ink is 0%. The spectral reflectance of the first row indicates the spectral reflectance of the printing medium M. The spectral reflectance is not limited to the measured values shown in FIG. 4. The wavelength of light and the like to be measured can be appropriately set. The measured value such as the spectral reflectance or the like corresponds to an example of the colorimetric value.

The printer 60 generates the colorimetric data shown in FIG. 4. The printer 60 transmits the generated colorimetric data to the communication interface 27 of the print control device 10 via the printer communication interface 69. The printer 60 may convert the spectral reflectance into a color value. The printer 60 may transmit colorimetric data converted into color value to the print control device 10. The print control device 10 stores the transmitted colorimetric data in the data storage section 21. In addition to the colorimetric data, the printer 60 transmits the type of the printing medium M, the colorimetric conditions of the colorimetric unit 67, and the printing conditions of the test chart 110. The colorimetric condition can be used when the spectral reflectance is converted into a color value such as a Lab value or the like. The communication interface 27 of the print control device 10 receives the transmitted type of printing medium M, colorimetric conditions, printing conditions, and the like. The data storage section 21 of the print control device 10 stores the received data such as the type of the printing medium M, the colorimetry condition, and the print condition in association with the colorimetric data in the data storage section 21.

The colorimetric data may be generated by a colorimeter (not shown). The colorimeter is connected to the print control device 10. The colorimeter is communicably connected to the communication interface 27 of the print control device 10. The colorimeter measures the spectral reflectance by performing colorimetry of the test chart 110 printed by the printer 60. The colorimeter may acquire the print setting value in advance and generate the colorimetric data based on the acquired print setting value and the colorimetric measured spectral reflectance. The colorimeter transmits the generated colorimetric data to the print control device 10. The colorimeter may convert the spectral reflectance into the color value. The colorimeter transmits the colorimetric data converted into color values to the print control device 10. The colorimeter may transmit the measured spectral reflectance to the print control device 10. The print control device 10 may generate the colorimetric data based on the spectral reflectance transmitted from the colorimeter and the print setting value acquired in advance and store the colorimetric data in the data storage section 21. The print control device 10 may convert the spectral reflectance into a color value. The print control device 10 may store the colorimetric data converted into the color values in the data storage section 21.

The colorimetric data may be stored in advance in a server (not shown). The server is communicably connected to the communication interface 27 of the print control device 10. The print control device 10 acquires the colorimetric data stored in the server.

The print control device 10 acquires the colorimetric data generated by the printer 60, or the like, in the data storage section 21. As an example, the print control device 10 receives the colorimetric data transmitted from the printer 60 through the communication interface 27. The print control device 10 stores the colorimetric data composed of the print setting values and the spectral reflectance in the data storage section 21. The print control device 10 may store the colorimetric data including the print setting values and the color values obtained by converting the spectral reflectance in the data storage section 21. The data storage section 21 may temporarily acquire the colorimetric data transmitted from the printer 60 or the like.

First Embodiment

The first embodiment shows an operation in which the print control device 10 causes the display unit 40 to display the input profile image 220 and the printer gamut 230. The print control device 10 causes the display unit 40 to display the input profile image 220 and the printer gamut 230 selected by the input operation of the user.

Figure 5:
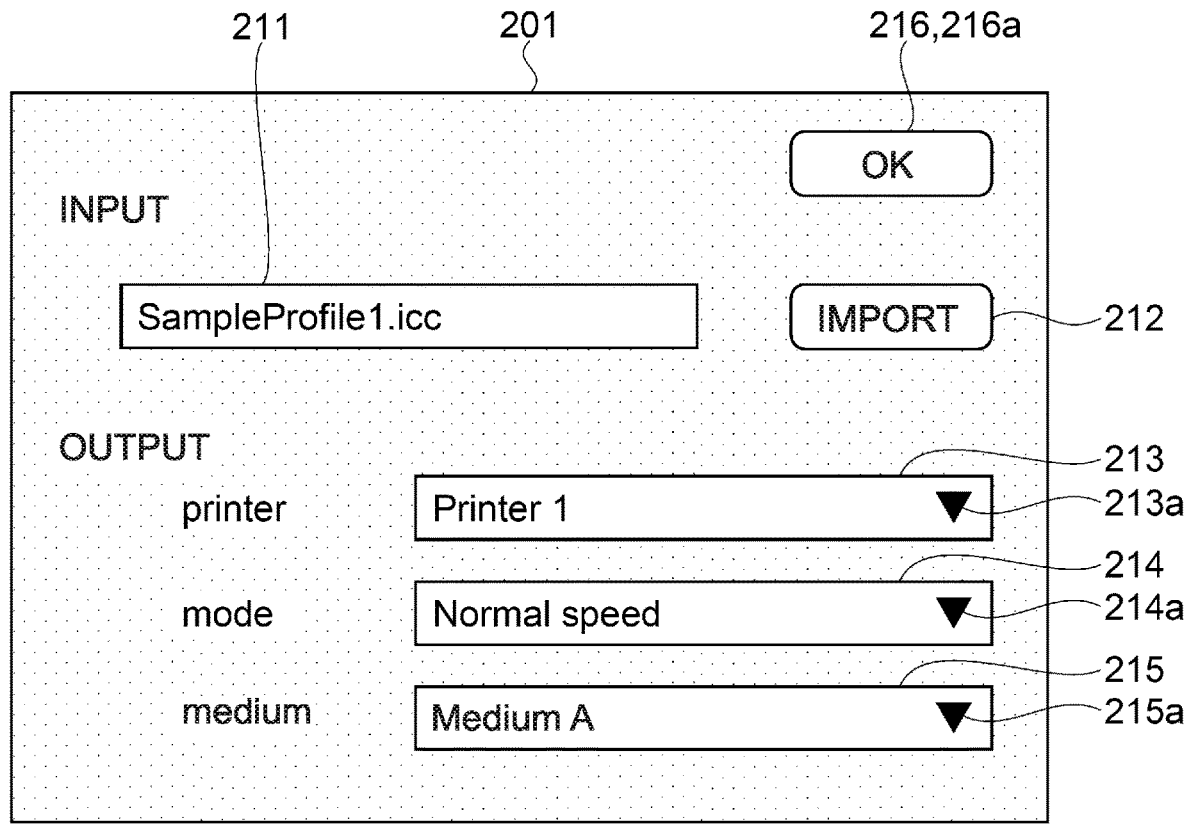
FIG. 5 shows an input screen displayed on a display unit.

FIG. 5 shows an input screen 201 displayed on the display unit 40. The input screen 201 is displayed on the display unit 40 based on the input screen display data. The input screen display data is display data that causes the display unit 40 to display the input screen 201. The input screen display data is stored in the data storage section 21 in advance. The input screen display data is transmitted from the print control device 10 to the display unit 40. The print control device 10 transmits the input screen display data stored in the data storage section 21 to the display unit 40 via the connection unit 25.

The input screen 201 displays an input profile name display box 211, a read button 212, a printer name display box 213, a mode display box 214, a medium name display box 215, and a first determination button 216a. The input profile name display box 211 and the read button 212 are input sections related to the input profile. The printer name display box 213, the mode display box 214, and the medium name display box 215 are input sections related to the output profile. The input screen 201 illustrated in FIG. 5 displays an input section related to the input profile and an input section related to an output profile, but is not limited thereto. The display unit 40 may display the input section related to the input profile and the input section related to the output profile on different screens. The input relating to the output profile may not be displayed on the display unit 40.

The input profile name display box 211 displays a file name of the input profile. The input profile name display box 211 displays the file name of the input profile selected by the input operation of the user. The input operation of the user is received by the input unit 50. When no input operation is performed by the user, the input profile name display box 211 is blank. FIG. 5 shows a file name displayed in the input profile name display box 211. When the input profile is selected by the user's input operation, the input profile name display box 211 displays the file name as shown in FIG. 5.

The read button 212 accepts the user's input operation. When the user clicks the read button 212 by using the input unit 50, the read button 212 accepts the input operation of the user. When the user's input operation is accepted by the read button 212, the display unit 40 displays a selection screen (not shown). When the user selects the desired input profile from the selection screen, the input profile name display box 211 displays the file name of the selected input profile. The input screen 201 may display a pull-down menu display button (not shown) in place of the read button 212. When the user operates the pull-down menu display button, the input screen 201 displays a pull-down menu (not shown). The pull-down menu displays a plurality of input profile names. The user selects a desired input profile name from the input profile names displayed in the pull-down menu. The input profile name display box 211 displays the file name of the selected input profile.

The printer name display box 213 displays the printer name. The printer name display box 213 displays the printer name of the printer 60 selected by the user. The printer name display box 213 displays a printer selection button 213a. The printer selection button 213a receives an input operation of the user. When the user clicks the printer selection button 213a using the input unit 50, the printer selection button 213a accepts the input operation by the user. When the printer selection button 213a receives the user input operation, a pull-down menu (not shown) is displayed. The pull-down menu displays a plurality of printer names. The user selects a desired printer name from the displayed printer names. The printer name display box 213 displays the name of the selected printer.

The mode display box 214 displays a mode name. The mode display box 214 displays a mode name selected by the user. The mode display box 214 displays a mode selection button 214a. The mode selection button 214a receives an input operation of the user. When the user clicks the mode selection button 214a using the input unit 50, the mode selection button 214a accepts an input operation by the user. When the mode selection button 214a receives the user input operation, a pull-down menu (not shown) is displayed. The pull-down menu displays a plurality of mode names. The displayed mode names are names of print modes selectable in the printer 60. The print mode includes a high-speed print mode, a normal print mode, a high-definition mode, or the like. The user selects a desired mode name from the displayed mode names. The mode display box 214 displays a selected mode name. The print mode shown in the mode display box 214 in FIG. 5 is the normal print mode.

The medium name display box 215 displays the name of the printing medium M. The name of the printing medium M represents the type of the printing medium M. The medium name display box 215 displays the name of the printing medium M selected by the user. The medium name display box 215 displays a medium selection button 215a. The medium selection button 215a receives an input operation of the user. When the user clicks the medium selection button 215a using the input unit 50, the medium selection button 215a accepts the input operation by the user. When the medium selection button 215a accepts the input operation by the user, a pull-down menu (not shown) is displayed. The pull-down menu displays the names of a plurality of print media M. The user selects a desired name of the printing medium M from among the names of the printing media M displayed. The medium name display box 215 displays the name of the selected printing medium M.

The first determination button 216a is an example of a determination button 216. The determination button 216 accepts the user input operation. When the user clicks the determination button 216 by using the input unit 50, the determination button 216 accepts the user input operation. When the first determination button 216a receives the input operation by the user, the print control device 10 determines the input result to the input screen 201 by the input operation by the user. The input result is transmitted to the print control device 10 as the input data. The printing control device 10, based on the input data, specifies the printer 60, the printing mode, and the type of the printing medium M that are the targets of the input profile and the output profile. The print control device 10 reads the input profile data based on the input data.

In a case where the input profile data is stored in the computer 30, a server (not illustrated), or the like, the print control device 10 acquires the input profile data from the server or the like and stores the input profile data in the data storage section 21. The data processing section 19 reads input profile data of the file name displayed in the input profile name display box 211 from the data storage section 21. The data processing section 19 acquires the read input profile data and stores it in the work area.

The print control device 10 reads colorimetric data based on input data. The data processing section 19 reads the colorimetric data associated with the printer name displayed in the printer name display box 213, the printing conditions displayed in the mode display box 214, and the type of the printing medium M displayed in the medium name display box 215 from the data storage section 21. The data processing section 19 acquires the read colorimetric data and stores it in the work area.

Figure 6:
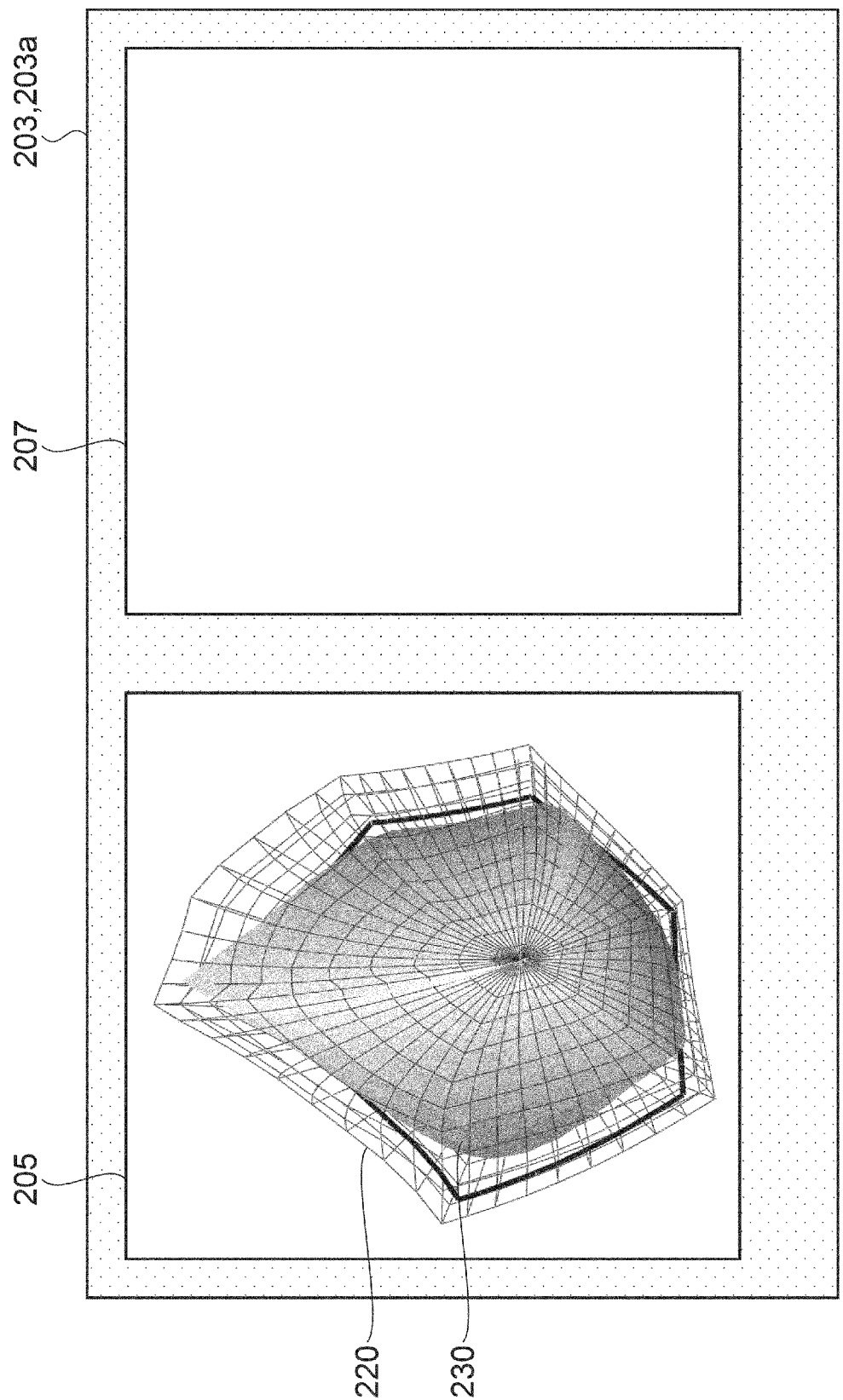
FIG. 6 is a schematic diagram of a first setting screen.

The data processing section 19 shown in FIG. 2, generates the input profile image 220 shown in FIG. 6, based on the input profile data stored in the work area. The input profile image 220 to be generated is a three dimensional image. The input profile image 220 is expressed by a three dimensional stereoscopic image or a wireframe image. Three dimensional stereoscopic image is represented by a plurality of colors. The data processing section 19 generates an input profile image 220 of a three dimensional image and transmits it to the screen generation section 17. The input profile image 220 corresponds to an example of an input color space image related to an input device.

The data processing section 19 generates the printer gamut 230 shown in FIG. 6, based on the colorimetric data stored in the work area. The generated printer gamut 230 is a three dimensional image. The printer gamut 230 is expressed by a three dimensional stereoscopic image or a wireframe image. Three dimensional stereoscopic image is represented by a plurality of colors. The data processing section 19 generates the printer gamut 230 of the three dimensional image and transmits it to the screen generation section 17. The printer gamut 230 corresponds to an example of an output color space image related to an output device.

When the colorimetric data is received from the printer 60 by the communication interface 27, the data processing section 19 may generate the printer gamut 230 based on the received the colorimetric data. When the input unit related to the output profile is not displayed on the input screen 201, the data processing section 19 generates the printer gamut 230 in accordance with the reception of the colorimetric data.

The screen generation section 17 shown in FIG. 2 generates setting screen data for displaying the setting screen 203 by using the input profile image 220 and the printer gamut 230. The screen generation section 17 generates the setting screen data when the connection unit 25 receives the input data or when the data processing section 19 acquires colorimetric data. The setting screen data is display data for causing the display unit 40 to display the setting screen 203. The setting screen data causes display of a profile display area 205 and a condition input area 207. The setting screen data corresponds to an example of screen data.

FIG. 6 schematically shows a first setting screen 203a. The first setting screen 203a is an example of the setting screen 203. The setting screen 203 is displayed on the display unit 40 based on the setting screen data. The first setting screen 203a includes the profile display area 205 and the condition input area 207. The first setting screen 203a does not show an image that can be input to the condition input area 207. In the first setting screen 203a shown in FIG. 6, the profile display area 205 and the condition input area 207 are displayed side by side, but this is not limiting. The profile display area 205 and the condition input area 207 may be displayed on different display screens.

The profile display area 205 displays the input profile image 220 and the printer gamut 230. The input profile image 220 shown in FIG. 6 is a wireframe image. The printer gamut 230 shown in FIG. 6 is shown as a three dimensional stereoscopic image. The printer gamut 230 is represented by a color image. The printer gamut 230 is indicated by a color corresponding to the coordinates. In the profile display area 205 shown in FIG. 6, the input profile image 220 and the printer gamut 230 are displayed in an overlapping manner, but this is not limiting. In the profile display area 205, the input profile image 220 and the printer gamut 230 may be displayed side by side. The profile display area 205 corresponds to an example of an image display area.

By displaying the input profile image 220 and the printer gamut 230 as a three dimensional image, the user can easily grasp the relationship between the respective color gamuts. The input profile image 220 and the printer gamut 230 are formed of a color gamut surrounded by six surfaces. A line connecting each surface constitutes a ridge line. When the input profile image 220 is displayed as a three dimensional image, the user can easily recognize the ridge line of the input profile. By the printer gamut 230 being displayed side by side with the input profile image 220, the user can easily understand the relationship between the vertexes of the input profile image 220 and the vertexes of the printer gamut 230.

In the profile display area 205, it is preferable that the input profile image 220 and the printer gamut 230 are displayed in an overlapping manner. The user can more easily understand the relationship between the position of the vertex, the ridge line, or the like of the input profile image 220 and the position of the vertex, the ridge line, or the like of the printer gamut 230.

The print control device 10 causes the display unit 40 to display the first setting screen 203a that displays the input profile image 220 related to the input devices and the printer gamut 230 related to the printer 60. The print control device 10 includes the data storage section 21 for acquiring the input profile data and colorimetric data, the data processing section 19 for generating the input profile image 220 of a three dimensional image based on the input profile data and the printer gamut 230 of a three dimensional image based on the colorimetric data, the screen generation section 17 for generating setting screen data for displaying the first setting screen 203a including the profile display area 205 for displaying the input profile image 220 and the printer gamut 230 generated by the data processing section 19, and the connection unit 25 for transmitting the setting screen data generated by the screen generation section 17 to the display unit 40.

This makes it easier for the user to visually check the ridge line of the input profile image 220. The user can easily grasp the relationship between the input profile image 220 and the printer gamut 230.

In the profile display area 205, it is preferable that the input profile image 220 and the printer gamut 230 are displayed in an overlapping manner.

Figure 7:
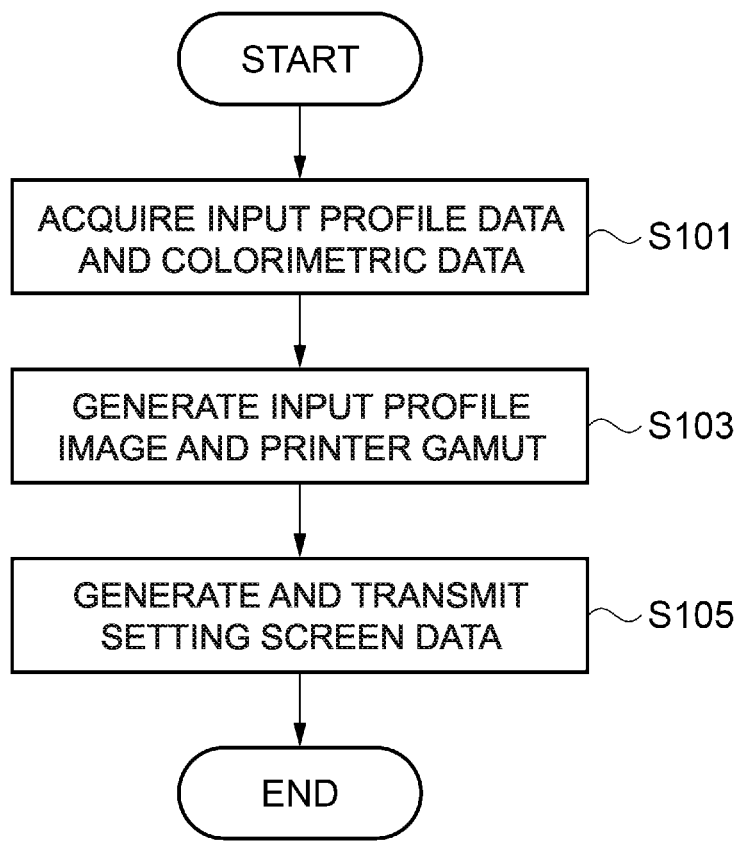
FIG. 7 is a flowchart for displaying a setting screen on the display unit.

The user can easily grasp the relationship between the input profile image 220 and the printer gamut 230. FIG. 7 shows a flowchart for displaying the setting screen 203 on the display unit 40. FIG. 7 shows a part of a method for creating a profile. The print control device 10 generates setting screen data. The print control device 10 transmits the generated setting screen data to the display unit 40, and causes the display unit 40 to display the first setting screen 203a.

In step S101, the print control device 10 acquires the input profile data and the colorimetric data. The control unit 15 of the print control device 10 acquires the input profile data in advance. The data processing section 19 generates the input profile data of an ICC profile in advance. The communication interface 27 may receive the input profile data from the computer 30, a server, or the like. The data storage section 21 acquires the input profile data from the data processing section 19 or the communication interface 27, and stores the input profile data.

The print control device 10 acquires the colorimetric data by receiving the colorimetric data from the printer 60. The communication interface 27 may receive a measured value such as spectral reflectance from the printer 60 or a colorimeter. The data processing section 19 generates colorimetric data based on the received measured value. When the colorimetric data received by the communication interface 27 includes a spectral reflectance, the data processing section 19 converts the spectral reflectance into a color value. The data storage section 21 acquires and stores colorimetric data from the communication interface 27 or the data processing section 19.

After acquiring the input profile data and the colorimetric data, the print control device 10 generates the input profile image 220 and the printer gamut 230 in step S103. The data processing section 19 of the print control device 10 generates the input profile image 220 and the printer gamut 230 when it receives input data input to the input screen 201 from the input unit 50. Alternatively, when colorimetric data is received from the printer 60, the data processing section 19 generates the input profile image 220 and the printer gamut 230. When the data processing section 19 receives the colorimetric data from the printer 60, it temporarily stores the colorimetric data in the data storage section 21 or in the work area of the data processing section 19.

The data processing section 19 reads desired input profile data from the data storage section 21. The data processing section 19 reads, for example, the input profile data specified by the input data. The data processing section 19 generates the input profile image 220 based on the read input profile data. The input profile image 220 to be generated is a three dimensional image. The data processing section 19 generates the input profile image 220 such as a wireframe image, a three dimensional image, or the like. The data processing section 19 transmits the generated input profile image 220 to the screen generation section 17.

The data processing section 19 reads out the colorimetric data stored in the data storage section 21 or the work area of the control unit 15. The data processing section 19 generates the printer gamut 230 based on the read colorimetric data. The generated printer gamut 230 is a three dimensional image. The data processing section 19 generates the printer gamut 230 such as a wireframe image or a three dimensional stereoscopic image. The data processing section 19 transmits the generated printer gamut 230 to the screen generation section 17.

After generating the input profile image 220 and the printer gamut 230, the print control device 10 generates setting screen data and transmits it to the display unit 40 in step S105. The connection unit 25 of the print control device 10 causes the display unit 40 to display the first setting screen 203a as an example of the setting screen 203 by transmitting the setting screen data to the display unit 40.

The screen generation section 17 generates the setting screen data including the input profile image 220 and the printer gamut 230 received from the data processing section 19. The setting screen data displays the profile display area 205 on the first setting screen 203a. The screen generation section 17 generates the setting screen data for displaying the input profile image 220 and the printer gamut 230 on the profile display area 205. The screen generation section 17 may generate the setting screen data for displaying the input profile image 220 and the printer gamut 230 superimposed on the profile display area 205. The screen generation section 17 transmits the generated setting screen data to the display unit 40 via the connection unit 25. Based on the transmitted setting screen data, the display unit 40 displays the first setting screen 203a including the profile display area 205 for displaying the input profile image 220 and the printer gamut 230. The first setting screen 203a displays the input profile image 220 which is a three dimensional image and the printer gamut 230 which is a three dimensional image.

In the profile creation method, the first setting screen 203a for displaying the input profile image 220 related to input devices and the printer gamut 230 related to the printer 60 is displayed on the display unit 40. The print control device 10 acquires the input profile data and the colorimetric data. Next, the input profile image 220 of a three dimensional image based on the input profile data and the printer gamut 230 of a three dimensional image based on the colorimetric data are generated. Then, the first setting screen 203a including the profile display area 205 in which the input profile image 220 and the printer gamut 230 are displayed is generated, then, the setting screen data is transmitted to the display unit 40 and the first setting screen 203a is displayed on the display unit 40.

This makes it easier for the user to visually check the ridge line of the input profile image 220. The user can easily grasp the relationship between the input profile image 220 and the printer gamut 230.

Second Embodiment

The second embodiment shows an operation of generating an output profile using a mapping condition input to the setting screen 203. The print control device 10 generates a BtoA table included in an output profile based on a mapping condition input by the user. The BtoA table is a conversion table that converts the color value of the profile connection space into a device output value for the printer 60. The mapping condition means a color conversion condition. The mapping condition corresponds to an example of a specified conversion condition.

Figure 8:
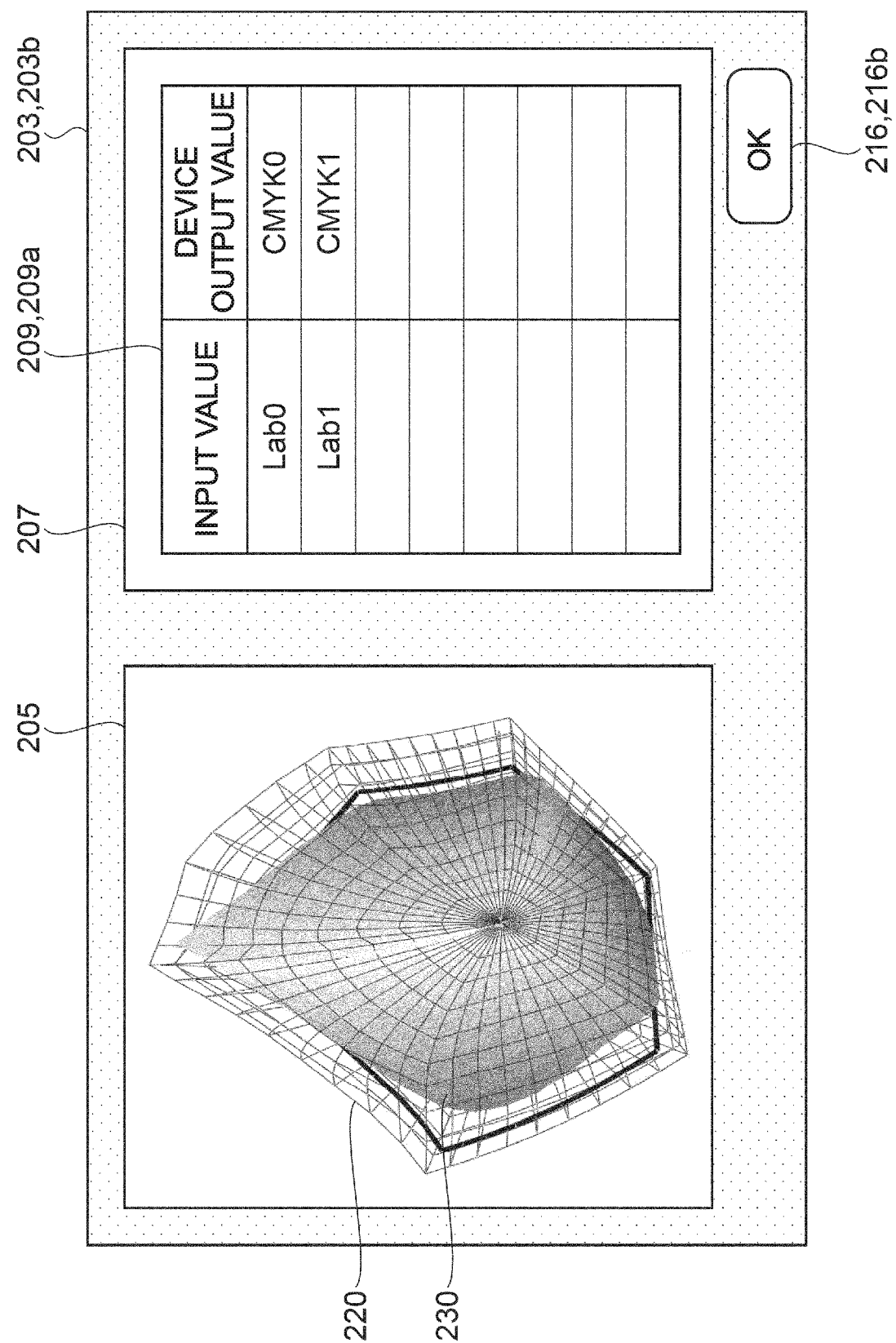
FIG. 8 is a schematic diagram of a second setting screen.

FIG. 8 schematically shows a second setting screen 203b. The second setting screen 203b is an example of the setting screen 203. The second setting screen 203b is displayed on the display unit 40 based on the setting screen data generated by the screen generation section 17. The setting screen data for displaying the second setting screen 203b is generated by the screen generation section 17 in the same manner as the setting screen data for displaying the first setting screen 203a shown in the first embodiment.

The second setting screen 203b displays the profile display area 205, the condition input area 207, and a second determination button 216b. The profile display area 205 displays the input profile image 220 and the printer gamut 230. The profile display area 205 shown in FIG. 8 is the same as the profile display area 205 shown in FIG. 6. The condition input area 207 displays a first condition input image 209a. The first condition input image 209a is an example of a condition input image 209. The condition input image 209 allows the user to input a mapping condition. The condition input area 207 corresponds to an example of an input area.

The first condition input image 209a displays the mapping condition input by the user. The mapping condition is input when the input unit 50 receives an input operation of the user. The first condition input image 209a displays a numerical value input by the user using the input unit 50. The first condition input image 209a may display a numerical value based on the position where the user clicks the input profile image 220 and the printer gamut 230 using the input unit 50.

The first condition input image 209a displays an input value and a device output value. The input value and the device output value are input by the user as a set. The input values shown in FIG. 8 are specified input values specified by the user. The specified input value is a value of the input profile image 220. The specified input value is a color value such as a Lab value. The device output value shown in FIG. 8 is a specified device output value specified by the user. This is ink amount data when printing is performed by the printer 60. The device output value corresponds to a predetermined position of the printer gamut 230.

As shown in FIG. 8, the Lab0, Lab1 are input as the specified input value. Lab0 and Lab1 represent a color value. Lab0 and Lab1 are represented by (L value, a value, b value). The L values are indicated in the range of 0 to 100. The "a" values are indicated in the range of −128 to 127. The "b" values are indicated in the range of −128 to 127. The specified input value is not limited to a Lab value. The specified input value may be an XYZ value or the like. The specified input value corresponds to an example of a specified color value.

As shown in FIG. 8, the CMYK0, CMYK1 are input as the specified device output value. The CMYK0 corresponds to the Lab0. The CMYK1 corresponds to the Lab1. The values Lab0 and CMYK0 specify that an image having a color value of Lab0 is printed by the printer 60 with an ink amount of CMYK0. CMYK0, CMYK1 represent an amount of ink. CMYK0, CMYK1 are represented by (cyan ink amount, magenta ink amount, yellow ink amount, and black ink amount). The cyan ink amount indicates an ink amount of cyan ink. The magenta ink amount indicates an ink amount of magenta ink. The yellow ink amount indicates an ink amount of the yellow ink. The black ink amount indicates an ink amount of black ink. The ink amount of each ink is indicated by a value from 0 to 100. Each ink amount is indicated by a gradation value with the maximum value of the ink ejection amount being 100%. The ink amount 100% indicates an ink amount when a predetermined number of ink dots are discharged to a region where a predetermined number of ink dots having a predetermined size can be discharged. Each ink amount may be represented by a gradation value from 0 to 255. The specified device output value corresponds to an example of a specified output value.

Although the first condition input image 209a shown in FIG. 8 shows two sets of specified input values and specified device output values, but this is not limiting. The set of the specified input value and the specified device output value may be input as one set, or may be three or more sets. The set of the specified input value and the specified device output value indicates a mapping condition.

When the specified input value and the specified device output value are input to the first condition input image 209a, the profile display area 205 may display the specified input value and the specified device output value. The profile display area 205 displays a specified input value image indicating the specified input value at the coordinates of the input profile image 220 corresponding to the specified input value. The profile display area 205 displays the specified device output value image indicating the specified device output value at the coordinates of the printer gamut 230 corresponding to the specified device output value.

The second determination button 216b is an example of the determination button 216. When the second determination button 216b receives an input operation of the user, the print control device 10 determines the mapping condition input to the first condition input image 209a by the input operation of the user. The mapping condition is received by the connection unit 25 of the print control device 10. The print control device 10 creates an output profile based on the received mapping conditions. The screen generation section 17 generates the condition input area 207 for inputting a mapping condition for converting a specified input value of the input profile image 220 into a specified device output value of the printer gamut 230. The user can input a mapping condition.

The screen generation section 17 generates a setting screen data for displaying the second setting screen 203b including the condition input area 207. The connection unit 25 transmits the generated setting screen data to the display unit 40 and receives the mapping condition input to the second setting screen 203b.

The user can visually check the input profile image 220 and the printer gamut 230, and the user can input the mapping condition.

When acquiring the mapping condition, the print control device 10 creates a BtoA table. The BtoA table forms part of the output profile. The data processing section 19 acquires the input profile data, the colorimetric data, and the mapping conditions. The input profile data to be acquired corresponds to the input profile image 220 displayed on the second setting screen 203b. The colorimetric data corresponds to the printer gamut 230 displayed on the second setting screen 203b. The print control device 10 creates the BtoA table based on the input profile data, the colorimetric data, and the mapping conditions.

Figure 9:
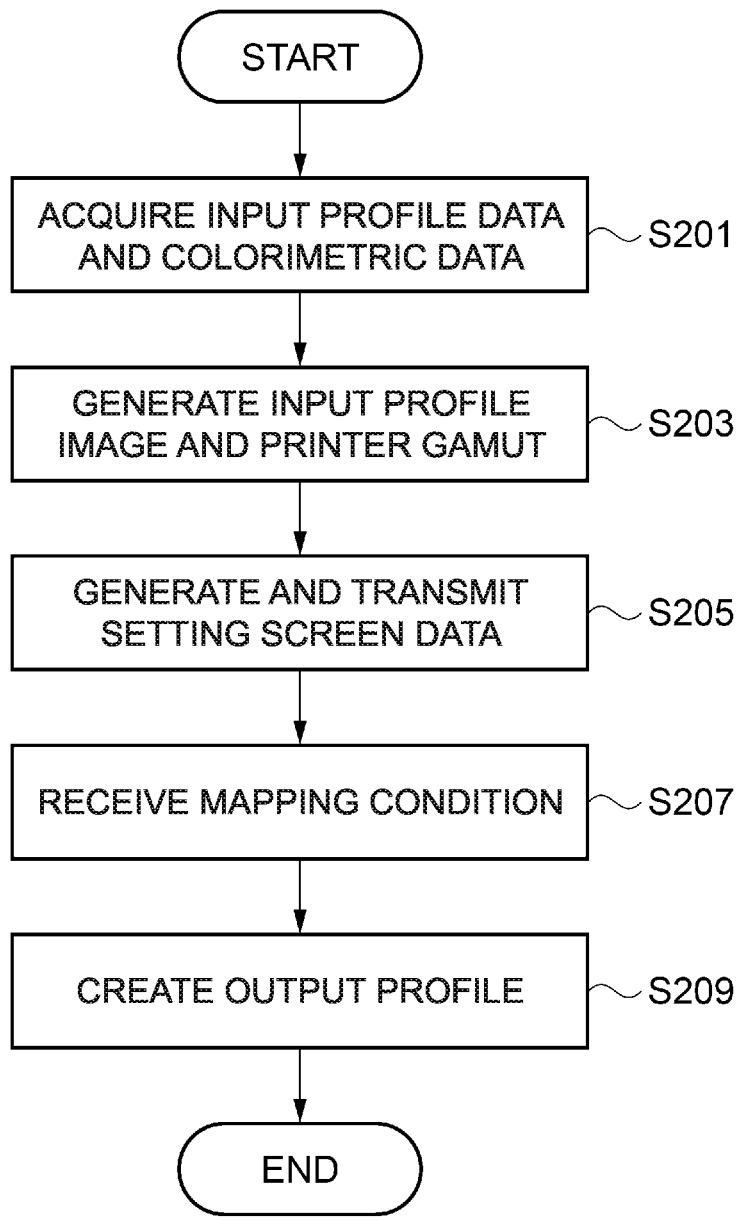
FIG. 9 is a flowchart for creating an output profile.

FIG. 9 shows a flowchart for creating an output profile. FIG. 9 shows a method for creating a profile. The print control device 10 creates the BtoA table constituting a part of the output profile.

In step S201, the print control device 10 acquires the input profile data and the colorimetric data. Similarly to the first embodiment, the data storage section 21 acquires input profile data from the data processing section 19 or the communication interface 27, and stores the input profile data.

After acquiring the input profile data and the colorimetric data, then in step S203 the print control device 10 generates the input profile image 220 and the printer gamut 230. As in the first embodiment, the data processing section 19 generates the input profile image 220 and the printer gamut 230. The data processing section 19 transmits the generated input profile image 220 and printer gamut 230 to the screen generation section 17.

After generating the input profile image 220 and the printer gamut 230, then in step S205 the print control device 10 generates setting screen data and transmits it to the display unit 40. The print control device 10 transmits the setting screen data to the display unit 40, thereby causing the display unit 40 to display the second setting screen 203b as an example of the setting screen 203.

The screen generation section 17 generates the setting screen data including the input profile image 220 and the printer gamut 230 received from the data processing section 19. The setting screen data causes the profile display area 205 and the condition input area 207 to be displayed on the second setting screen 203b. The screen generation section 17 generates the setting screen data for displaying the input profile image 220 and the printer gamut 230 on the profile display area 205. The screen generation section 17 may generate the setting screen data for displaying the input profile image 220 and the printer gamut 230 superimposed on the profile display area 205. The screen generation section 17 generates setting screen data for displaying the condition input image 209 in the condition input area 207. The screen generation section 17 transmits the generated setting screen data to the display unit 40 via the connection unit 25. Based on the transmitted setting screen data, the display unit 40 displays the input profile image 220, the profile display area 205 indicating the printer gamut 230, and the second setting screen 203*b* including the condition input area 207 for displaying the condition input image 209. The second setting screen 203*b* displays the input profile image 220, which is a three dimensional image, and the printer gamut 230, which is a three dimensional image. After transmitting the setting screen data to the display unit 40, then in step S207 the print control device 10 receives the mapping condition.

The mapping condition includes one or more sets of specified input values and specified device output values. The mapping condition is input by the user. The user visually checks the second setting screen 203*b* and inputs the mapping condition using the input unit 50. The connection unit 25 receives the mapping conditions from the input unit 50. The connection unit 25 transmits the received mapping condition to the data processing section 19.

After receiving the mapping condition, then in step S209 the print control device 10 creates the output profile. The data processing section 19 creates the BtoA table based on the acquired input profile data, the colorimetric data, and the mapping conditions. The data processing section 19 acquires the input profile data when generating the input profile image 220. The data processing section 19 acquires the colorimetric data when generating the printer gamut 230. The data processing section 19 transmits the output profile including the generated BtoA table to the data storage section 21. The data storage section 21 stores the received output profile.

The profile generation method generates the condition input area 207 for inputting mapping conditions for converting the color values of the input profile image 220 into the specified device output values of the printer gamut 230, generates the setting screen data for displaying the second setting screen 203*b* including the condition input area 207, displays the second setting screen 203*b* on the display unit 40, receives the mapping conditions input to the displayed condition input area 207, and generates the output profile based on the received mapping conditions.

The user can visually check the input profile image 220 and the printer gamut 230, and the user can input the mapping condition.

Third Embodiment

Figure 10:
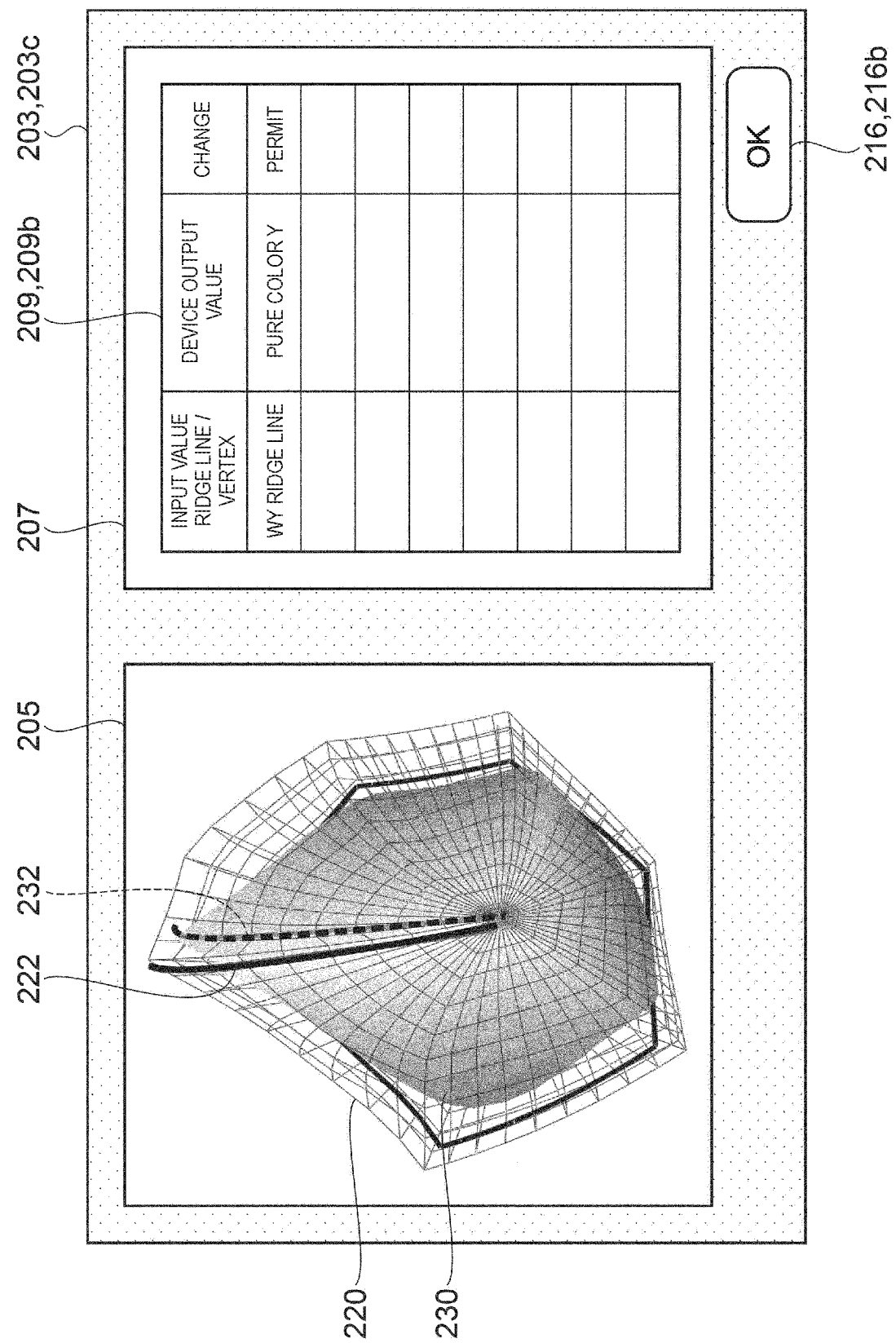
FIG. 10 is a schematic diagram of a third setting screen.

In the third embodiment, the setting screen 203 displayed on the display unit 40 based on the setting screen data is explained. FIG. 10 shows a third setting screen 203*c*. The third setting screen 203*c* is an example of the setting screen 203.

The third setting screen 203*c* is displayed in place of the second setting screen 203*b* of the second embodiment. The third setting screen 203*c* displays an input value display image 222, an output value display image 232, and a second condition input image 209*b*. The profile display area 205 displayed on the third setting screen 203*c* is the same as the profile display area 205 displayed on the second setting screen 203*b*. The second determination button 216*b* displayed on the third setting screen 203*c* is the same as the second determination button 216*b* displayed on the second setting screen 203*b*. The input profile image 220 displayed on the third setting screen 203*c* is the same as the input profile image 220 displayed on the second setting screen 203*b*. The printer gamut 230 displayed on the third setting screen 203*c* is the same as the printer gamut 230 displayed on the second setting screen 203*b*.

The second condition input image 209*b* displays input value, device output value, and permit/deny change. The input value, the device output value, and the permit/deny change are input by the user as a set. The input value corresponds to the color value of the input profile image 220. The device output value corresponds to a predetermined position of the printer gamut 230. The set of the input value, the device output value, and the permit/deny change displayed in the second condition input image 209*b* corresponds to an example of the mapping conditions.

The input value is specified input information specified by the user. The specified input information is a ridge line or a vertex of the input profile image 220. The vertex is the maximum chroma point of the hue. The specified input information shown in FIG. 10 is a WY ridge line. The WY ridge line indicates a ridge line connecting the color value of paper white and the maximum chroma point of yellow. The color value of paper white is the color value of the print medium M which has not been printed on.

The device output value displays the text entered by the user. The displayed text indicates the device output value group corresponding to the specified input information. The device output value group includes one or more device output values. The Y pure color shown in FIG. 10 indicates a device output value group. A pure color indicates a device output value group outputted by an ink of a predetermined color system. For example, a cyan pure color is a device output value group output with a cyan type ink. When the printer 60 uses the dark cyan ink and the light cyan ink, the cyan type inks are the dark cyan ink and the light cyan ink. The pure color Y indicates a device output value group output with yellow ink.

Figures 11, 12:
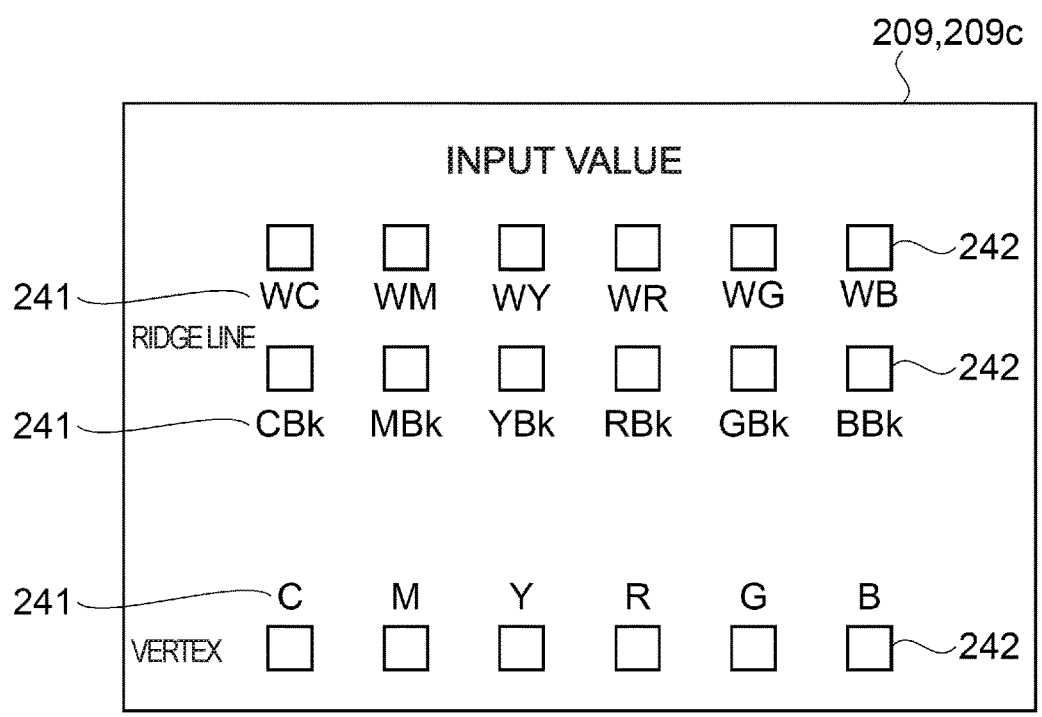
FIG. 11 is a table showing the relationship between the specified input information and the specified device output value group.
FIG. 12 shows a third condition input image.

FIG. 11 shows the relationship between the specified input information and the specified device output value group. FIG. 11 shows the specified input information, inputted to the third setting screen 203*c* shown in FIG. 10, and the specified device output value group by numerical values. The input value in FIG. 11 indicates a specified input value. The device output value in FIG. 11 indicates the specified device output value. The specified input information is the WY ridge line, and the specified device output value is the pure color Y. The specified input information is represented by a plurality of specified input values. In FIG. 11, the specified input value is indicated using the color values of (L value, a value, b value). In FIG. 11, the specified device output value is indicated by (cyan ink amount, magenta ink amount, yellow ink amount, black ink amount). Each ink amount is represented by a gradation value from 0 to 255. The ridge lines such as WY ridge lines are indicated by a plurality of specified input values. The WY ridge line shown in FIG. 10 corresponds to a plurality of input values shown in FIG. 11. FIG. 11 shows ten input values, but this is not a limitation. A ridge line is represented by two or more input values.

As shown in FIG. 11, the plurality of device output values correspond to the plurality of input values indicating the ridge line. A device output value group including a plurality of device output values corresponds to a plurality of input values indicating a ridge line. The plurality of device output values are associated with values of printer gamut 230. The pure color Y is represented by a yellow ink amount. The yellow pure color does not include cyan ink, magenta ink, and black ink.

As shown in FIG. 10, when the user specifies a ridge line as the specified input information and specifies a pure color as the specified device output value, the data processing section 19 determines that a plurality of specified input values and a plurality of device output values corresponding to the plurality of specified input values are specified.

The second condition input image 209b displays the permit/deny change. The permit/deny change is specified by the user. The permit/deny change column indicates "permit" or "deny". "Permit" means that the user allows the data processing section 19 to change the relationship between the specified input information and the specified device output value group. When the data processing section 19 performs image processing with priority given to image quality such as gradation, "permit" indicates that the user permits change to the specified device output value corresponding to the specified input value. "Deny" means that the user does not allow the data processing section 19 to change the relationship between the specified input information and the specified device output value group. When the data processing section 19 performs the image processing, "deny" indicates that the user does not permit change of the specified device output value with respect to the specified input value.

The input value display image 222 indicates a ridge line or a vertex displayed in the second condition input image 209b. The input value display image 222 is displayed in the profile display area 205. The input value display image 222 is displayed superimposed on the input profile image 220. The input value display image 222 shown in FIG. 10 indicates the WY ridge line. When the ridge line or a vertex is input as an input value of the second condition input image 209b, the input value display image 222 is displayed. The input value display image 222 corresponds to an example of a ridge line image.

The output value display image 232 shows the device output value displayed on the second condition input image 209b. The output value display image 232 is displayed in the profile display area 205. The output value display image 232 is displayed superimposed on the printer gamut 230. The output value display image 232 shown in FIG. 10 indicates the values of the printer gamut 230 corresponding to the pure color Y. When the device output value of the second condition input image 209b is input, the output value display image 232 is displayed. The output value display image 232 corresponds to an example of an output image.

The mapping condition includes a plurality of specified input values on the ridge line indicated by the input profile image 220 and a plurality of specified device output values corresponding to the plurality of specified input values indicated by the printer gamut 230.

The user can use the ridge line shown on the input profile image 220 as a mapping condition.

The profile display area 205 displays the input value display image 222 indicating a ridge line is superimposed on the input profile image 220, and the output value display image 232 indicating the device output value group including a plurality of device output values is superimposed on the printer gamut 230. The user can check the specified input information and the specified device output value group on the display image. The user can easily grasp the relationship between the specified input information and the specified device output value group.

The user may select a predetermined ridge line on the input profile image 220 displayed on the profile display area 205. When the user selects a predetermined ridge line of the input profile image 220 with the input unit 50, the input value may be displayed on the second condition input image 209b. When the user selects a predetermined ridge line of the input profile image 220 with the input unit 50, the input value display image 222 may be displayed. The input value display image 222 is superimposed on a predetermined ridge line.

The user may specify a predetermined position of the printer gamut 230 displayed on the profile display area 205. When the user selects a predetermined position of the printer gamut 230 with the input unit 50, a device output value may be displayed on the second condition input image 209b. When the user selects a predetermined position of the printer gamut 230 with the input unit 50, the output value display image 232 may be displayed.

Fourth Embodiment

Figure 13:
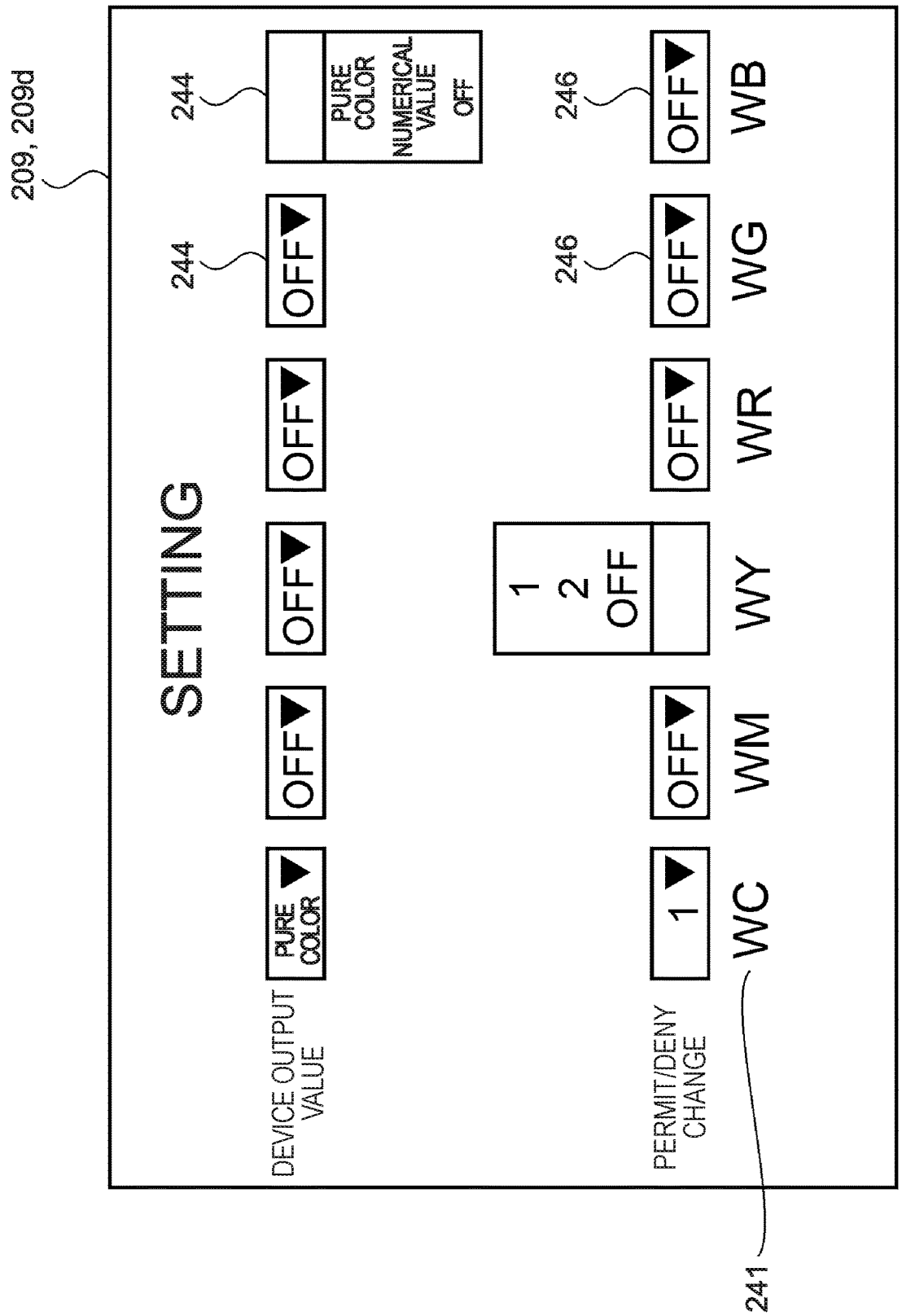
FIG. 13 shows a fourth condition input image.

In the fourth embodiment, the condition input image 209 displayed in the condition input area 207 of the setting screen 203 based on the setting screen data is explained. FIGS. 12, 13, and 14 each show the condition input image 209 displayed in the condition input area 207. The condition input images 209 shown in FIGS. 12, 13, and 14 are displayed instead of the second condition input image 209b shown in FIG. 10.

FIG. 12 shows a third condition input image 209c. The third condition input image 209c is an example of the condition input image 209. FIG. 12 shows the third condition input image 209c in which the user inputs a ridge line or a vertex as a specified input value. The third condition input image 209c is displayed on the condition input area 207. The third condition input image 209c indicates a plurality of condition indications 241 and a plurality of condition selection boxes 242. The third condition input image 209c corresponds to an example of a selection image.

The condition indication 241 indicates a specified input value. The condition indication 241 shown in FIG. 12 indicates a ridge line and a vertex. The indices W, C, M, Y, Bk are used when a ridge line and a vertex of the input profile image 220 are indicated in the CMYK color space. The indices W, R, G, B are used when a ridge line and a vertex of the input profile image 220 are indicated in the RGB color space.

WC indicates a ridge line connecting the color value of paper white and the maximum chroma point of cyan. WM indicates a ridge line connecting the color value of paper white and the maximum chroma point of magenta. As described above, WY indicates a ridge line connecting the color value of paper white and the maximum chroma point of yellow. CBk indicates a ridge line connecting the maximum chroma point of cyan and the maximum chroma point of black. MBk indicates a ridge line connecting the maximum chroma point of magenta and the maximum chroma point of black. YBk indicates a ridge line connecting the maximum chroma point of yellow and the maximum chroma point of black. C indicates the maximum chroma point of cyan. M indicates the maximum chroma point of magenta. Y indicates the maximum chroma point of yellow.

WR indicates a ridge line connecting the color value of paper white and the maximum chroma point of red. WG indicates a ridge line connecting the color value of paper white and the maximum chroma point of green. WB indicates a ridge line connecting the color value of paper white and the maximum chroma point of blue. RBk indicates a ridge line connecting the maximum chroma point of red and the maximum chroma point of black. GBk indicates a ridge line connecting the maximum chroma point of green and the maximum chroma point of black. BBk indicates a ridge line connecting the maximum chroma point of blue and the maximum chroma point of black. R indicates the maximum chroma point of red. G indicates the maximum chroma point of green. B indicates the maximum chroma point of blue.

The condition selection box 242 is provided corresponding to the condition indication 241. The condition selection box 242 receives an operation input of the user. When an operation input of the user is received, the condition selection box 242 displays an image such as a check indicating that the condition selection box 242 is selected. A ridge line or a vertex corresponding to the condition selection box 242 for displaying an image is determined as a specified input value by the data processing section 19. The condition selection box 242 corresponds to an example of a ridge line selection section.

The specified device output value corresponding to the specified input value may be predetermined. For example, the data storage section 21 stores in advance that the specified device output value corresponding to the WC ridge line is the pure color of cyan. When the specified device output value corresponding to the ridge line or the vertex is stored in the data storage section 21 in advance, the user does not need to input the specified device output value. The specified device output value corresponding to the specified input value may be input to an output value setting screen (not shown). The user may input the specified device output value into the output value setting screen, as with the second condition input image 209b.

The condition input area 207 includes the third condition input image 209c for selecting a mapping condition.

The user can easily set a mapping condition by selecting a desired ridge line or vertex.

The third condition input image 209c includes the condition selection box 242 for selecting a ridge line shown in the input profile image 220.

The user can easily select a desired ridge line by clicking on the condition selection box 242.

FIG. 13 shows a fourth condition input image 209d. The fourth condition input image 209d indicates device output value and permit/deny change displayed in the second condition input image 209b in a manner selectable by pull-down menu. The specified input value is indicated in the condition indication 241. The condition indication 241 shown in FIG. 13 indicates a ridge line. The fourth condition input image 209d displays an output value selection box 244 and a changeability selection box 246.

In the output value selection box 244, the user selects a device output value corresponding to a ridge line which is a specified input value. The output value selection box 244 displays an output value selection item selected from a pull-down menu. The output value selection items are a pure color, a numerical value, and OFF. The pure color indicates a pure color on the printer gamut 230. The pure color indicates a pure color of ink such as the pure color of yellow. The numerical value is a device output value in the printer gamut 230. When a numerical value is selected, a numerical value input box (not shown) may be displayed. OFF indicates that the device output value is not set. The output value selection items may include a ridge line.

The changeability selection box 246 selects the permit/deny change of the specified device output value with respect to the specified input value. The changeability selection box 246 displays a setting selection item selected from a pull-down menu. The setting selection items are 1, 2, and OFF. "1" means the "deny" according to the third embodiment. "2" means the "permit" according to the third embodiment. "OFF" means that the permit/deny change is not set.

The user sets the device output value, corresponding to the ridge line, and sets the permit/deny change using the fourth condition input image 209d. In FIG. 13, for the WC ridge line, the device output value sets the pure color, and the permit/deny change is set "deny." The user can set the mapping condition by selecting the device output value and the permit/deny change from the pull-down menu for each ridge line.

FIG. 14 shows a fifth condition input image 209e. The fifth condition input image 209e is an example of the condition input image 209. Similarly to the second condition input image 209b, the fifth condition input image 209e indicates an input value, a device output value, and the permit/deny change.

The input value indicates the Lab value. The Lab value is represented by (L value, a value, b value). The user inputs the numerical values of the "L" value, the "a" value and the "b" value directly using the input unit 50. The user may input the Lab value by clicking a predetermined position of the input profile image 220 displayed in the profile display area 205. The user can enter multiple Lab values.

The device output value indicates an ink amount. The ink amount is represented by (cyan ink amount, magenta ink amount, yellow ink amount, and black ink amount). The user directly inputs the numerical value of each ink amount by using the input unit 50. The user may input the ink amount by clicking a predetermined position of the printer gamut 230 displayed on the profile display area 205. The user inputs a plurality of ink amounts corresponding to a plurality of Lab values.

The permit/deny change indicates whether to permit a change of the mapping condition. The user inputs the permit/deny select using the input unit 50. The input field of the permit/deny change may be displayed by a configuration in which the input field is selected in a pull-down menu (not shown). The user selects the permit/deny change from the pull-down menu.

The condition input image 209 is not limited to the first condition input image 209a, the second condition input image 209b, the third condition input image 209c, the fourth condition input image 209d, and the fifth condition input image 209e. The condition input image 209 can be appropriately set.

What is claimed is:

1. A profile creation device that causes a display section to display a display screen displaying an input color space image related to an input device and an output color space image related to an output device, the profile creation device comprising:
    an acquisition section that acquires first color gamut data indicating a color space related to the input device and second color gamut data indicating a color space related to the output device;
    an image generating section configured to generate an input color space image as a three dimensional image based on the first color gamut data and an output color space image as a three dimensional image based on the second color gamut data;

a display control section configured to generate screen data for displaying the display screen including an image display area for displaying the input color space image and the output color space image generated by the image generating section, and an input and output section for transmitting the screen data generated by the display control section to the display section.

2. The profile creation device, according to claim 1, wherein
the image display area displays the input color space image and the output color space image superimposed on each other.

3. The profile creation device, according to claim 1, wherein
the display control section generates an input area for inputting a specified conversion condition for converting a specified color value of the input color space image into a specified output value of the output color space image.

4. The profile creation device, according to claim 3, wherein
the display control section generates the screen data for displaying the display screen including the input area and
the input and output section transmits the generated display screen to the display section, and receives the specified conversion condition input to the display screen.

5. The profile creation device, according to claim 4, wherein
the specified conversion condition includes a plurality of specified color values on a ridge line indicated in the input color space image and a plurality of specified output values indicated in the output color space image.

6. The profile creation device, according to claim 5, wherein
the image display area displays a ridge line image indicating the ridge line superimposed on the input color space image, and displays an output image indicating the plurality of specified output values superimposed on the output color space image.

7. The profile creation device, according to claim 3, wherein
the input area includes a selection image for selecting the specified conversion condition.

8. The profile creation device, according to claim 7, wherein
the selection image includes a ridge line selection section for selecting a ridge line indicated in the input color space image.

9. A profile creation method for displaying a display screen for displaying an input color space image related to an input device and an output color space image related to an output device on a display section, the profile creation method comprising:

acquiring a first color gamut data indicating a color space related to the input device and a second color gamut data indicating a color space related to the output device;

generating an input color space image as a three dimensional image based on the first color gamut data and an output color space image as a three dimensional image based on the second color gamut data;

generating screen data for displaying the display screen including an image display area for displaying the input color space image and the output color space image; and displaying the display screen on the display section after transmitting the screen data to the display section.

10. A profile creation method, according to claim 9, further comprising:

generating an input area for inputting a specified conversion condition for converting a specified color value of the input color space image into a specified output value of the output color space image;

generating the screen data for displaying the display screen including the input area;

receiving the specified conversion condition input to the displayed input area after displaying the display screen on the display section, and generating an output profile based on the received specified conversion condition.

* * * * *